W. F. KELLER.
DRAFT EQUALIZER FOR HARROWS.
APPLICATION FILED MAY 22, 1909.

987,996.

Patented Mar. 28, 1911.

Witnesses
A. H. Opsahl.
B. F. Goodwin.

Inventor.
W. F. Keller
By his Attorneys
Williamson Merchant

UNITED STATES PATENT OFFICE.

WILLIAM F. KELLER, OF SAUK CENTER, MINNESOTA.

DRAFT-EQUALIZER FOR HARROWS.

987,996.  Specification of Letters Patent.  Patented Mar. 28, 1911.

Application filed May 22, 1909. Serial No. 497,610.

*To all whom it may concern:*

Be it known that I, WILLIAM F. KELLER, a citizen of the United States, residing at Sauk Center, in the county of Stearns and State of Minnesota, have invented certain new and useful Improvements in Draft-Equalizers for Harrows; and I do hereby declare the following to be a full, clear, and exact description of the invention, such as will enable others skilled in the art to which it appertains to make and use the same.

My invention relates particularly to draft equalizers for harrows and has for its object to improve the same in the several particulars hereinafter noted.

The invention consists of the novel devices and combination of devices hereinafter described and defined in the claims.

In the accompanying drawings which illustrate the invention, like characters indicate like parts throughout the several views.

Figure 1:
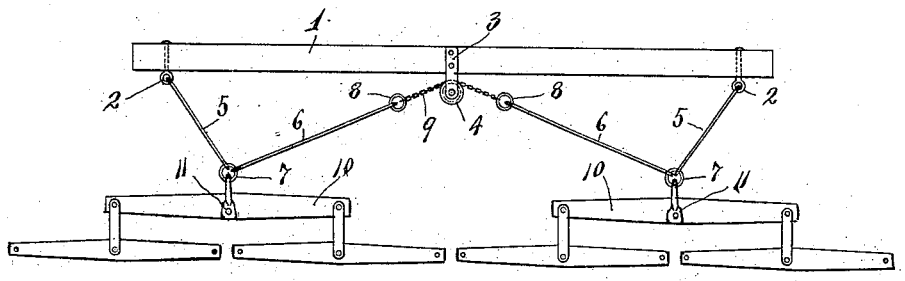
Figure 2:
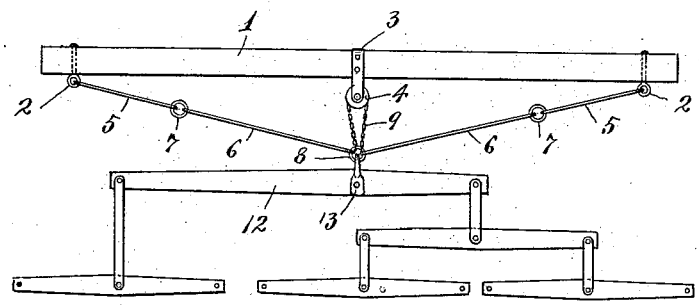

Referring to the drawings: Figures 1 and 2 are plan views illustrating the different adjustments of the draft equalizer.

The numeral 1 indicates a long heavy beam usually designated as the drag beam and to which the harrows in a transverse row are adapted to be attached in the customary or any suitable way. Frequently also in practice, this drag beam is provided with end extensions, not herein shown, and not necessary for the purposes of this case to consider. It may be stated however, that this drag beam 1 is very long and hence it is desirable to apply the draft force thereto at three points to-wit: at its center and at its end portions. Hence, eye bolts 2 are secured to the beam 3 near its ends, and at its middle portion said beam has rigidly secured middle straps 3, to which a sheave 4 is journaled.

It has been customary to connect at will, either a pair of two horse eveners or a three horse evener to the ends and intermediate portions of the drag beam 1, and my invention is directed particularly to the improvement of this connection which will now be described in its preferred form.

The jointed equalizing connection, as preferably constructed, is made up of rods 5 and 6, and links or rings 7 and 8, and a chain 9. The outer ends of the rods 5 are pivotally connected to the eye-bolts 2, the inner ends of the rods 6 are connected to the ends of the chain 9 by the links 8 and the rods 5 and 6 are pivotally connected by the links 7. The chain 9 runs over the sheave 4. The links 7 and 8 constitute couplings to which in the adjustment shown in Fig. 1, two horse eveners 10 may be detachably connected by clevises or any suitable coupling devices, which latter will engage with the coupling links 7. When the two horse eveners are thus coupled, the equalizing action between the two teams, as is evident, is taken care of by a flexible equalizing connection 5—6—9.

The above described flexible connection, exclusive of the chain or central flexible section 9, is of greater length than the distance between the beam attached ends of the said connection so that when the links are brought together and drawn forward, away from the beam 1, the said rods 5 and 6 and links 7 and 8 form the hypotenuses of two right angle triangles, the bases of which are in the beam 1 and the common third side of which is in the chain and sheave.

An improved feature of my invention is found in the relative length of the chain 9 in respect to the total length of the flexible equalizing connection and briefly stated, consists in making said chain 9 of such length that when the equalizers are detached from the coupling links 7, and the two coupling links 8 are drawn forward, brought together and connected to a three horse evener 12 by clevis 13, or other suitable coupling device as shown in Fig. 2, the said chain 9 will be drawn taut at the same time that the two extended portions 5—6—7, on the opposite sides thereof are also drawn taut. Thus it will be seen that without requiring interchangeable chains 9 of different length and without requiring any adjustment or any part of the flexible draft connection in respect to its length, a construction is provided wherein, under all adjustments, draft strains will be distributed to the intermediate and end portions of the long draft beam 1. To accomplish the result above stated, the chain 9 must be in length, approximately twice the distance between the sheave 4 and the two links 8 when the latter are brought together and pulled away from the beam 1, until the two reversely extended portions of the equalizing connection are taut.

What I claim is:

1. The combination with a drag beam, of a jointed equalizing connection attached at its ends to the end portions of said beam and provided with inner and outer coupling links and a flexible central section connecting said inner coupling links, and guided by a part applied to the central portion of said beam, and which jointed equalizing connection, exclusive of said flexible central section is of greater aggregate length than the distance between the secured outer ends thereof, and which flexible central section is of such length that it will be drawn taut when the inner coupling links are brought together and pulled away from said beam until the reversely extended portions of said jointed equalizing connection are also drawn taut.

2. The combination with a drag beam having a central bearing and a sheave 4 journaled to the latter, of a flexible equalizing connection attached at its outer ends to the end portions of said beam, and made up of rods 5 and 6, chain 9 and coupling links 7 and 8, and which flexible connection, exclusive of said chain is of greater length than the distance between the attached outer ends of said connection, and which chain runs over said guide sheave 4, and is of such length that it will be drawn taut when said inner links 8 are brought together and drawn away from said beam, until said rods 5 and 6, and links 7 are drawn taut on the opposite sides of said chain.

In testimony whereof I affix my signature in presence of two witnesses.

WILLIAM F. KELLER.

Witnesses:
 B. C. DERRICK,
 C. A. HEMPHILL.

---

Copies of this patent may be obtained for five cents each, by addressing the "Commissioner of Patents, Washington, D. C."